(12) United States Patent
Hsu et al.

(10) Patent No.: US 11,846,875 B1
(45) Date of Patent: Dec. 19, 2023

(54) LIGHT VALVE MODULE AND PROJECTOR HAVING THE SAME

(71) Applicant: Coretronic Corporation, Hsin-Chu (TW)

(72) Inventors: Ting-Jung Hsu, Hsin-Chu (TW); Yii-Wen Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/851,038

(22) Filed: Jun. 28, 2022

(51) Int. Cl.
G03B 21/16 (2006.01)
G03B 21/20 (2006.01)
F21V 29/75 (2015.01)

(52) U.S. Cl.
CPC ............. *G03B 21/16* (2013.01); *F21V 29/75* (2015.01); *G03B 21/20* (2013.01)

(58) Field of Classification Search
CPC .......... G03B 21/16; G03B 21/20; F21V 19/75
See application file for complete search history.

(56) References Cited

U.S. PATENT DOCUMENTS

2019/0129237 A1* 5/2019 Nishi .................... G03B 21/16

FOREIGN PATENT DOCUMENTS

CN 212255995 12/2020

* cited by examiner

*Primary Examiner* — Andrew J Coughlin
*Assistant Examiner* — Jessica M Apenteng
(74) *Attorney, Agent, or Firm* — JCIPRNET

(57) ABSTRACT

The disclosure provides a light valve module comprising a main casing, a light valve element, a heat dissipation structure and a supporting component. The light valve element is connected to the main casing. The heat dissipation structure is connected to the main casing and is in contact with the light valve element. The supporting component comprises an extending portion and a supporting portion. An end of the extending portion is connected to the main casing. The supporting portion is formed on another end of the extending portion. A part of the heat dissipation structure is suspended above the extending portion and adapted to be supported by the supporting portion.

20 Claims, 7 Drawing Sheets

LIGHT VALVE MODULE AND PROJECTOR HAVING THE SAME

BACKGROUND

Technical Field

The disclosure relates to a light valve module and a projector, and more particularly, to a light valve module having a heat dissipation assembly and a projector including the light valve module.

Description of Related Art

A projection device is a display device for generating a large-sized frame. A light valve of a projection device is to convert an illumination beam generated by a light source into an image beam, and then to project the image beam onto a screen or a wall through a projection lens of the projection device so as to form an image. With advancement in projection techniques and reduction in manufacturing cost of projection devices, applications of projection devices have been gradually expanded from commercial use to household use. Main components of a projection device include a light source, a light valve, and a projection lens. An illumination beam generated by a light source is converted into an image beam via a light valve, and then the image beam is projected via a projection lens.

A conventional light valve could be a digital micro-mirror device (DMD), a liquid-crystal-on-silicon panel (LCOS panel), or a transmissible liquid crystal panel. As to the digital micro-mirror device (DMD), the heat generated therefrom can be dissipated by a heat dissipation fin set which is connected to a heat dissipation plate of the digital micro-mirror device (DMD) through a plurality of heat pipes. Generally, the heat dissipation fin set is merely supported by the heat pipes. In addition, the more the heat dissipation requirement is, the heavier the heat dissipation fin set is. Thus, the weight of the heat dissipation fin set may cause the heat dissipation plate and the digital micro-mirror device (DMD) to be slightly separated from each other, which renders the heat dissipation efficiency thereof lower.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a light valve module which having a light valve element with good heat dissipation efficiency.

The disclosure provides a projector, wherein a light valve module has a light valve element with good heat dissipation efficiency.

Other objectives and advantages of the disclosure may be further understood from the technical features disclosed in the disclosure.

In order to achieve one or part or all of the above objectives or other objectives, an embodiment of the disclosure provides a light valve module including a main casing, a light valve element, a heat dissipation structure and a supporting component. The light valve element is connected to the main casing. The heat dissipation structure is connected to the main casing and in contact with the light valve element. The supporting component includes an extending portion and a supporting portion, wherein an end of the extending portion is connected to the main casing, the supporting portion is formed on another end of the extending portion, and a part of the heat dissipation structure is suspended above the extending portion and adapted to be supported by the supporting portion.

In order to achieve one or part or all of the above objectives or other objectives, an embodiment of the disclosure provides a projector including a light source, a light valve module and a projection lens. The light source is adapted to provide an illumination beam. The light valve module includes a main casing, a light valve element, a heat dissipation structure and a supporting component. The light valve element is connected to the main casing and adapted to convert the illumination beam into an image beam. The heat dissipation structure is connected to the main casing and in contact with the light valve element. The supporting component includes an extending portion and a supporting portion, wherein an end of the extending portion is connected to the main casing, the supporting portion is formed on another end of the extending portion, and a part of the heat dissipation structure is suspended above the extending portion and adapted to be supported by the supporting portion. The projection lens is adapted to project the image beam.

In an embodiment of the disclosure, the heat dissipation structure includes a heat dissipation plate, at least one heat pipe and a heat dissipation fin set, the heat dissipation plate is connected to the main casing and in contact with the light valve element, the at least one heat pipe is connected between the heat dissipation plate and the heat dissipation fin set, and the heat dissipation fin set is adapted to be supported by the supporting portion.

In an embodiment of the disclosure, the light valve module further includes a plurality of fastening elements, wherein the heat dissipation structure is fastened to the main casing by the fastening elements along a first direction, the heat dissipation structure extends from the light valve element to the supporting portion along a second direction perpendicular to the first direction, and the supporting portion is adapted to support the heat dissipation structure along a third direction perpendicular to the first direction and the second direction.

In an embodiment of the disclosure, the light valve module further includes a protruding piece, wherein the protruding piece is connected to the part of the heat dissipation structure and protrudes toward the supporting portion.

In an embodiment of the disclosure, the light valve module further includes a position-limiting element, wherein the protruding piece is limited on the supporting portion by the position-limiting element.

In an embodiment of the disclosure, the protruding piece has a slot, the position-limiting element includes a fastening portion and a position-limiting portion, the fastening portion is disposed through the slot and fastened to the supporting portion, and the position-limiting portion stops the protruding piece from moving away from the supporting portion.

In an embodiment of the disclosure, the light valve module further includes a plurality of fastening elements, wherein the heat dissipation structure is fastened to the main casing by the fastening elements along a first direction, and the slot extends along the first direction.

In an embodiment of the disclosure, a gap is formed between the protruding piece and the position-limiting portion.

In an embodiment of the disclosure, the position-limiting element is adhered to the protruding piece.

In an embodiment of the disclosure, a width of the extending portion is larger than a width of the part of the heat dissipation structure.

Based on the above, the embodiments of the disclosure have at least one of the following advantages or effects. The supporting component is additionally arranged under the heat dissipation structure and supports the heat dissipation structure by the supporting portion thereof. Thus, even the heat dissipation structure is heavy, the contact between the light valve element and the heat dissipation structure could be maintained due to the supporting of the supporting portion. Therefore, the heat dissipation structure could provide good heat dissipation efficiency to the light valve element.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
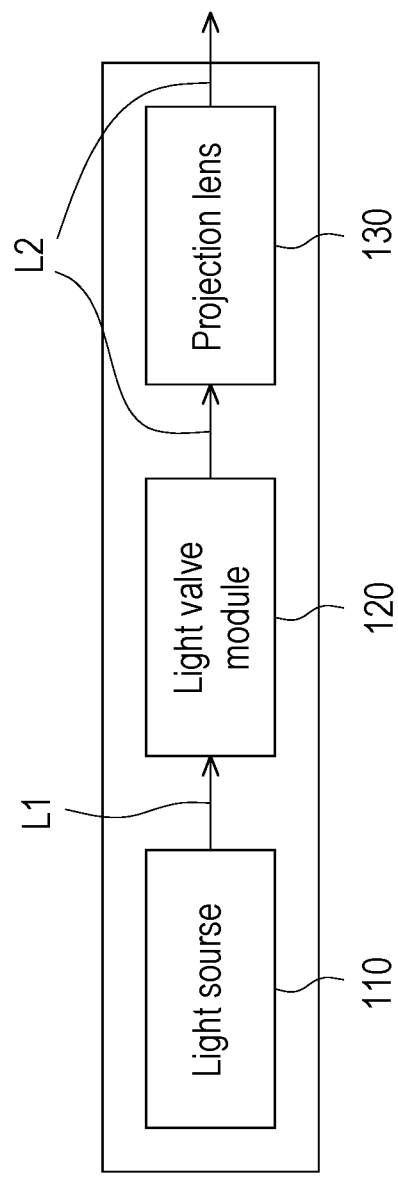
FIG. 1 is a schematic view of a projector according to an embodiment of the disclosure.

FIG. 1 is a schematic view of a projector according to an embodiment of the disclosure. Please refer to FIG. 1. A projector 100 of this embodiment includes a light source 110, a light valve module 120 and a projection lens 130. The light source 110 is adapted for providing an illumination beam L1. The light valve module 120 is located on the transmission path of the illumination beam L1, and is adapted for converting the illumination beam L1 into an image beam L2. The projection lens 130 is located on the transmission path of the image beam L2, and is adapted for projecting the image beam L2.

Figure 2:
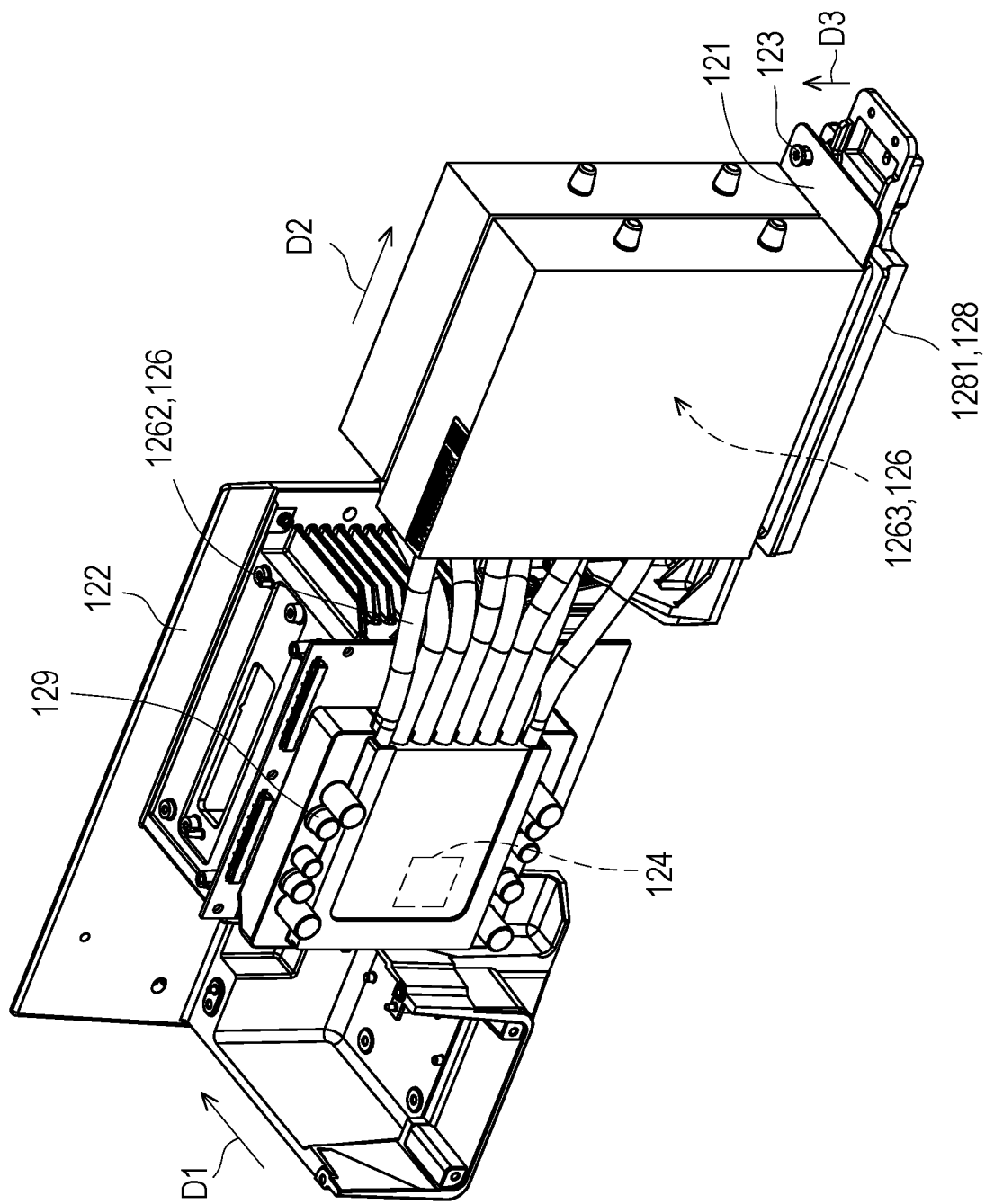
FIG. 2 and FIG. 3 are partial perspective views of the projector of FIG. 1 with different view angles.
Figure 3:
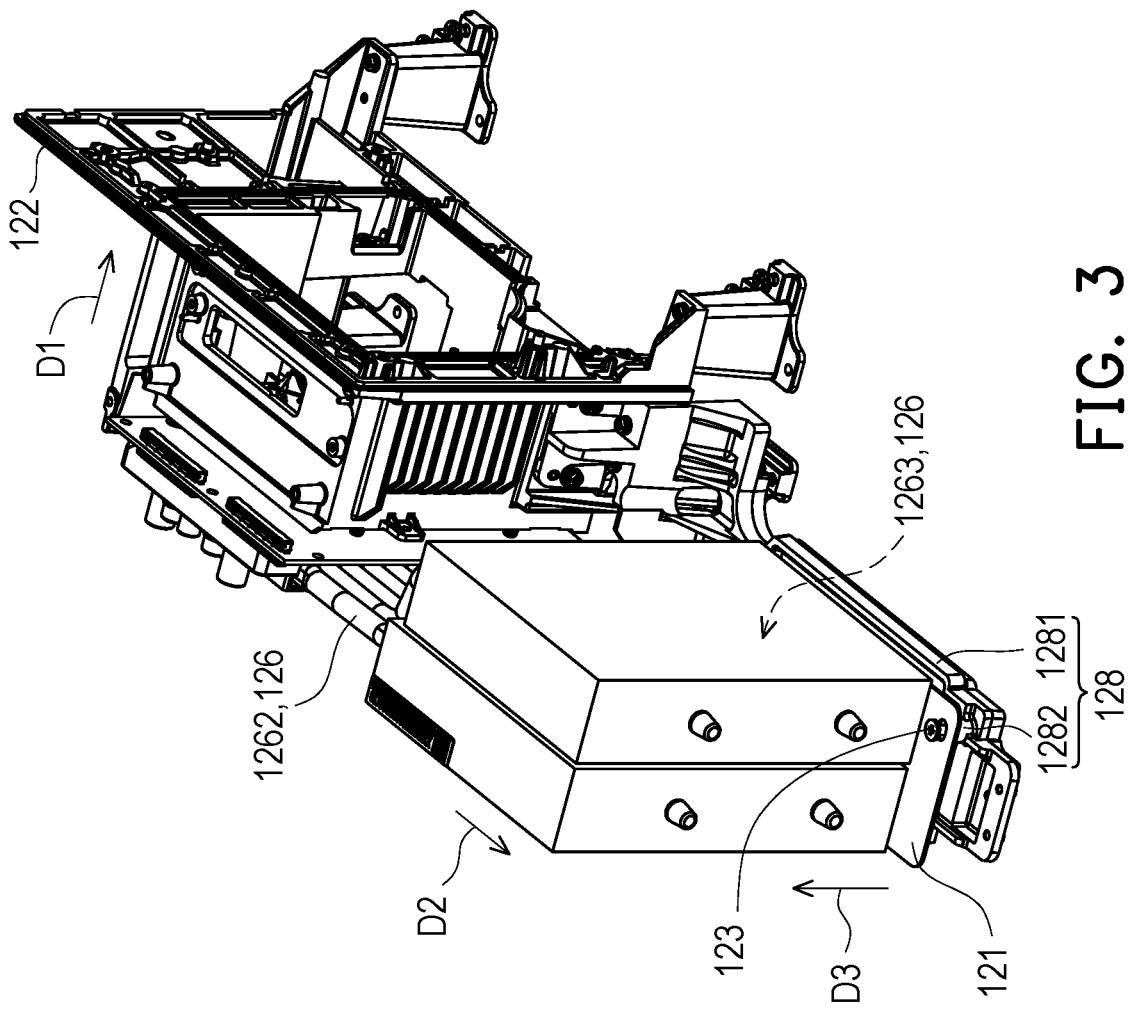
Figure 4:
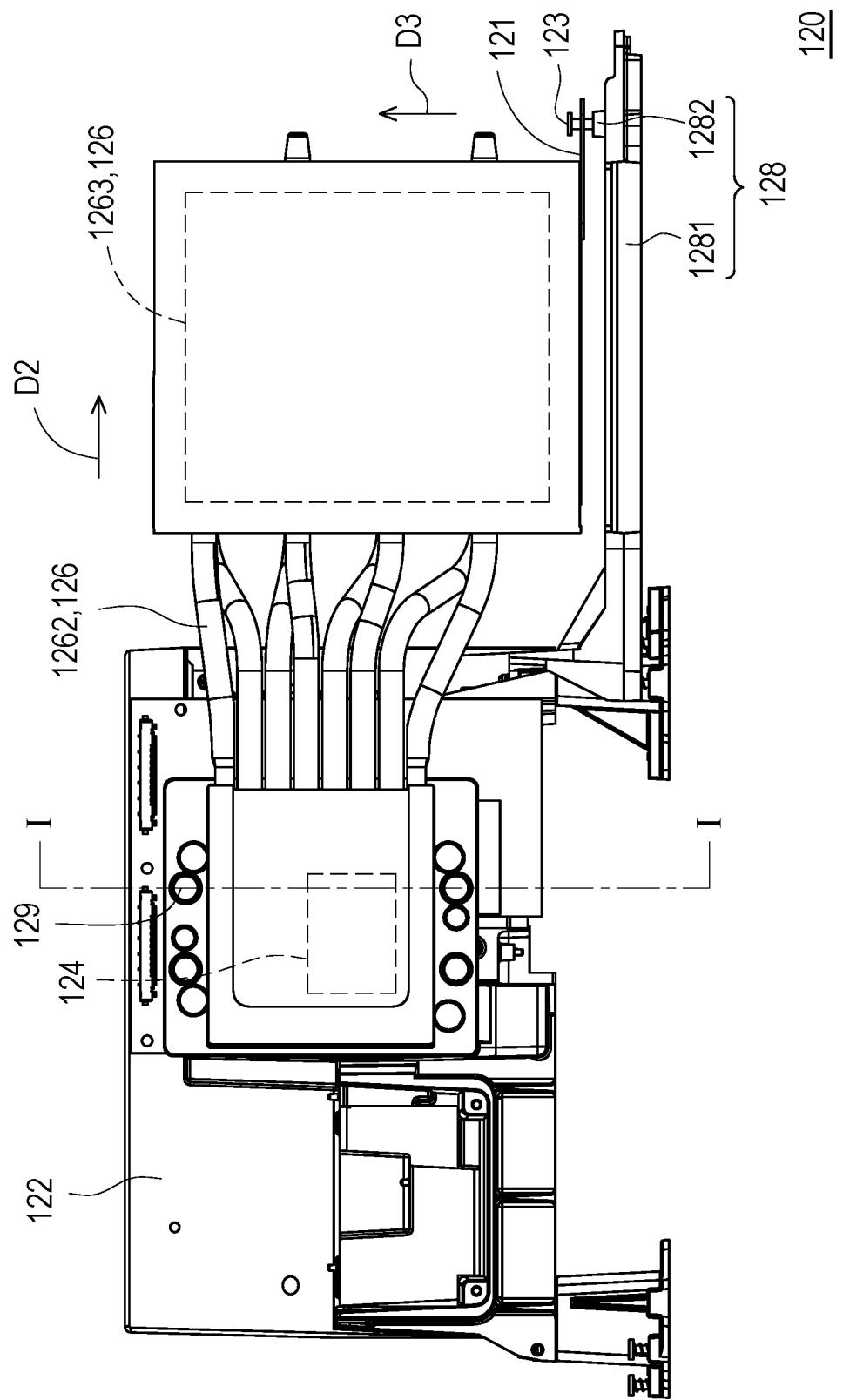
FIG. 4 is a front view of the projector of FIG. 2.

FIG. 2 and FIG. 3 are partial perspective views of the projector of FIG. 1 with different view angles. FIG. 4 is a front view of the projector of FIG. 2. Please refer to FIG. 2 to FIG. 4. The light valve module 120 includes a main casing 122, a light valve element 124 (illustrated in FIG. 2 and FIG. 4), a heat dissipation structure 126 and a supporting component 128. The main casing 122 is, for example, at least a part of a casing of an optical engine of the projector 100. The light valve element 124 is, for example one of a digital micro-mirror device (DMD) assembly and a liquid-crystal-on-silicon panel (LCOS panel) assembly. The digital micro-mirror device (DMD) is connected to the main casing 122 and disposed on the main casing 122 and adapted to receive the illumination beam L1 and convert the illumination beam L1 (illustrated in FIG. 1) into the image beam L2 (schematically illustrated in FIG. 2). The heat dissipation structure 126 is connected to the main casing 122 and in contact with the light valve element 124. The supporting component 128 includes an extending portion 1281 and a supporting portion 1282. An end of the extending portion 1281 is connected to the main casing 122 by screws, the supporting portion 1282 is formed on another end of the extending portion 1281, and a part of the heat dissipation structure 126 is suspended above the extending portion 1281 and adapted to be supported by the supporting portion 1282. A gap is between the extending portion 1281 and the heat dissipation structure 126 (the heat dissipation fin set 1263).

As described above, the supporting component 128 is additionally arranged under the heat dissipation structure 126 and supports the heat dissipation structure 126 by the supporting portion 1282 thereof. Thus, even the heat dissipation structure 126 is heavy, the contact between the light valve element 124 and the heat dissipation structure 126 could be maintained due to the supporting of the supporting portion 128. Therefore, the supporting of the supporting portion 128 is adapted to avoid heavy weight of the heat dissipation structure 126 and movement of the projector 100 causing swinging of the heat dissipation structure 126. Meanwhile, the heat dissipation structure 126 could provide good heat dissipation efficiency to the light valve element 124.

Figure 5:
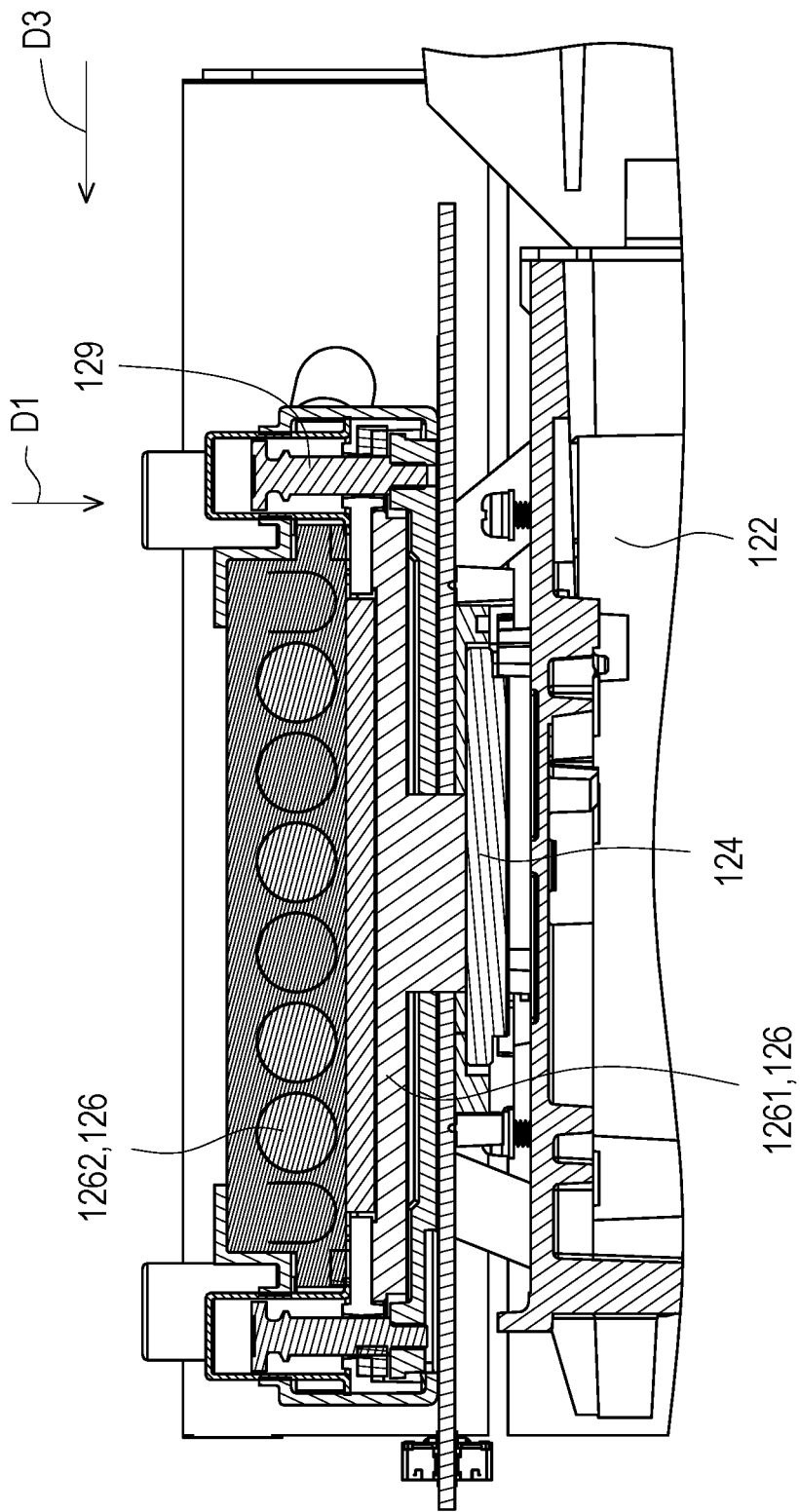
FIG. 5 is a partial cross-sectional view of the projector along line I-I of FIG. 2.

FIG. 5 is a partial cross-sectional view of the projector along line I-I of FIG. 4. Please refer to FIG. 2, FIG. 4 and FIG. 5. Specifically, the heat dissipation structure 126 includes a heat dissipation plate 1261, a plurality of heat pipes 1262 and a heat dissipation fin set 1263 (in FIG. 2). The heat dissipation plate 1261 is connected to the main casing 122 and in contact with the light valve element 124, the heat pipes 1262 are connected between the heat dissipation plate 1261 and the heat dissipation fin set 1263, and the heat dissipation fin set 1263 is adapted to be supported by the supporting portion 1282 of the supporting component 128. That is, the part of the heat dissipation structure 126 that suspended above the extending portion 1281 and adapted to be supported by the supporting portion 1282 is the heat dissipation fin set 1263. The heat dissipation structure 126 may have a plurality of the heat dissipation fin sets 1263.

In this embodiment, the light valve module 120 further includes a plurality of fastening elements 129, and the heat dissipation structure 126 and the heat dissipation plate 1261 thereof are fastened to the main casing 122 by the fastening elements 129 along a first direction D1. Each of the fastening elements 129 is screwed to the main casing 122 and fasten the heat dissipation structure 126 and the heat dissipation plate 1261 thereof onto the main casing 122 and the light valve element 124. The normal force along the first direction D1 between the light valve element 124 and the heat dissipation plate 1261 is, for example, designed to be lower than a predetermined value (e.g. 15.87 kg) to prevent the light valve element 124 from withstanding excessive force. The heat dissipation structure 126 extends from the light valve element 124 to the supporting portion 1282 of the supporting component 128 along a second direction D2 perpendicular to the first direction D1, and the supporting portion 1282 is adapted to support the heat dissipation structure 126 along a third direction D3 perpendicular to the first direction D1 and the second direction D2.

Referring to FIG. 2 to FIG. 4. More specifically, the light valve module 120 of this embodiment further includes a protruding piece 121. The protruding piece 121 is connected to the heat dissipation fin set 1263 and protrudes toward the supporting portion 1282 of the supporting component 128, such that the heat dissipation fin set 1263 is adapted to be supported by the supporting portion 1282 through a contact between the supporting portion 1282 and the protruding piece 121. In this embodiment, the protruding piece 121 is connected to the heat dissipation fin set 1263 by welding, such that protruding piece 121 is integrally connected with the heat dissipation fin set 1263. In other embodiments, the protruding piece 121 could be connected to the heat dissipation fin set 1263 by other assembling manners, and the disclosure is not limited thereto.

Figure 6:
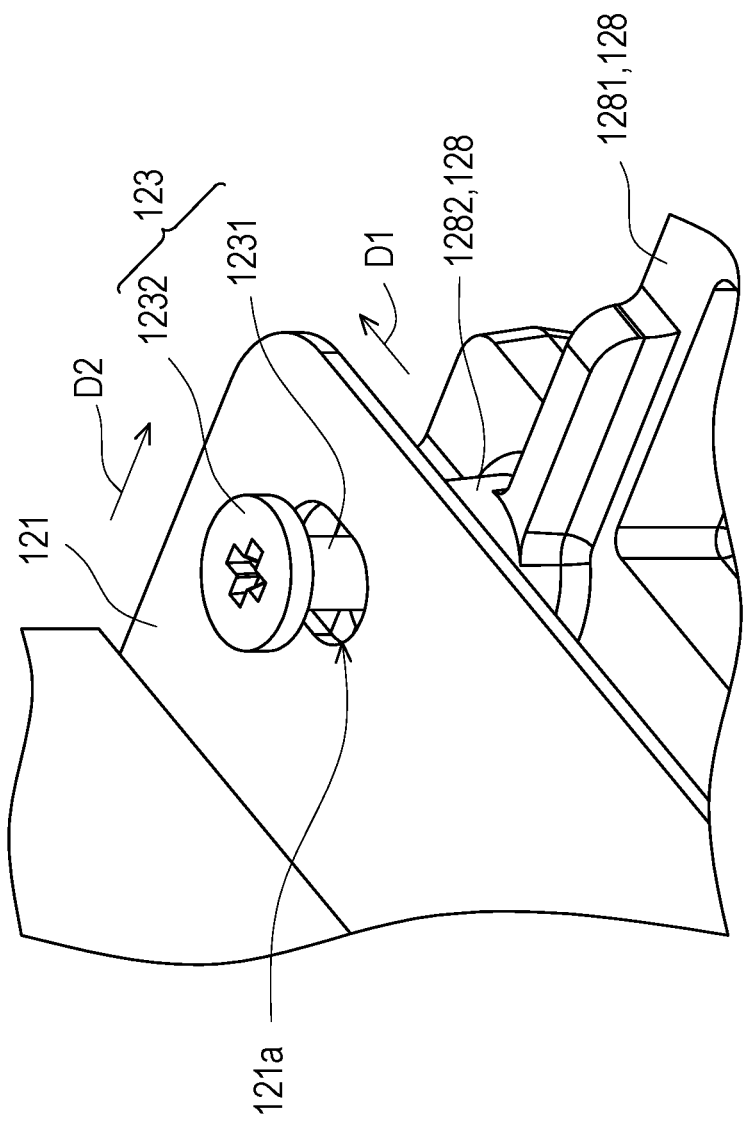
FIG. 6 is a partial perspective view of the protruding piece and the supporting portion of FIG. 2.
Figure 7:
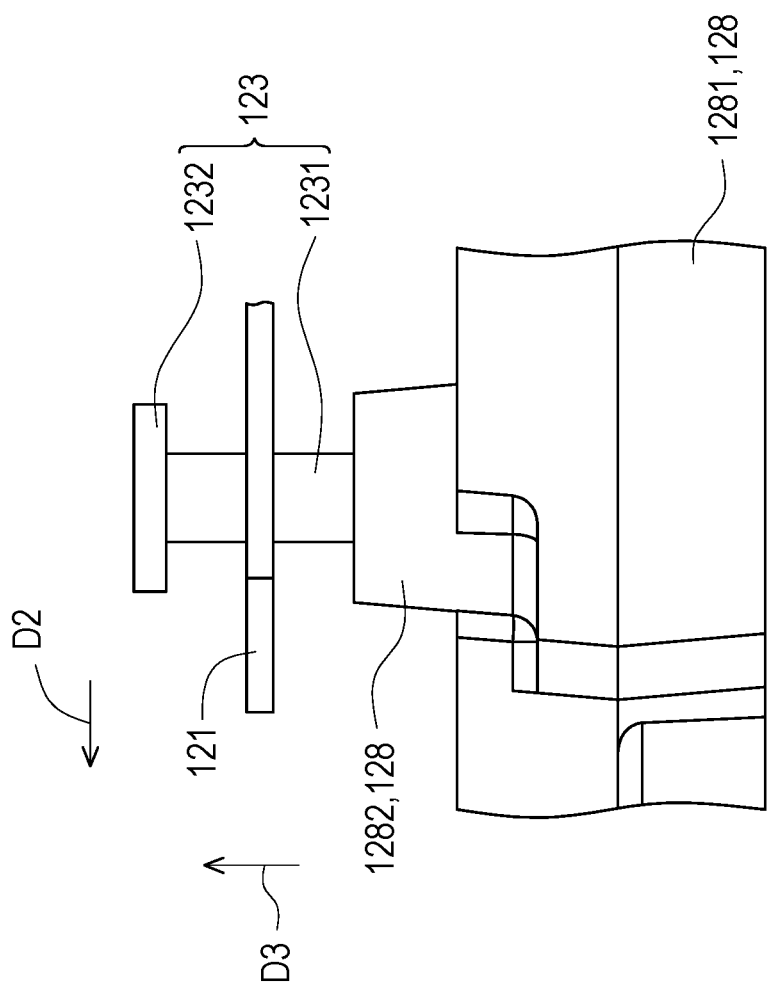
FIG. 7 is a rear view of the protruding piece and the supporting portion of FIG. 6.

FIG. 6 is a partial perspective view of the protruding piece and the supporting portion of FIG. 2. FIG. 7 is a rear view of the protruding piece and the supporting portion of FIG. 6. Referring to FIG. 4, FIG. 6 and FIG. 7, the light valve module 120 of this embodiment further includes a position-limiting element 123, the protruding piece 121 is limited on the supporting portion 1282 by the position-limiting element 123. Specifically, the protruding piece 121 has a slot 121a, and the position-limiting element 123 includes a fastening portion 1231 and a position-limiting portion 1232. The fastening portion 1231 is, for example, a screw portion, which is disposed through the slot 121a and fastened to the supporting portion 1282, and the position-limiting portion 1232 stops the protruding piece 121 from moving away from the supporting portion 1282.

In this embodiment, the slot 121a of the protruding piece 121 is designed to be extended along the first direction D1 as shown in FIG. 6. In this way, the assembling inaccuracy according to the screwing between the fastening elements 129 and the main casing 122 along the first direction D1 may be compensated by shifting between the slot 121a and the position-limiting element 123. In addition, a gap could be formed between the protruding piece 121 and the position-limiting portion 1232 and a gap could be formed between the protruding piece 121 and the supporting portion 1282 as shown in FIG. 7, so as to compensate assembling/manufacturing inaccuracies along the third direction D3. In other embodiments, the protruding piece 121 could be leaned against the supporting portion 1282, and the disclosure is not limited thereto. In this embodiment, a glue could be applied in the above-mentioned gaps and the slot 121a, such that the position-limiting element 123 is adhered to the protruding piece 121 and the protruding piece 121 is supported by the supporting portion 1282 firmly.

Referring to FIG. 2 and FIG. 3, in this embodiment, a width of the extending portion 1281 along the first direction D1 is larger than a width of the heat dissipation fin set 1263 of the heat dissipation structure 126. Thus, a collision to the heat dissipation fin set 1263 along the first direction D1 generated by the movement of the projector 100 may be avoided.

To sum up, the embodiments of the disclosure have at least one of the following advantages or effects. The supporting component is additionally arranged under the heat dissipation structure and supports the heat dissipation structure by the supporting portion thereof. Thus, even the heat dissipation structure is heavy, the contact between the light valve element and the heat dissipation structure could be maintained due to the supporting of the supporting portion. Therefore, the heat dissipation structure could provide good heat dissipation efficiency to the light valve element.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light valve module, comprising:
a main casing;
a light valve element, connected to the main casing;
a heat dissipation structure, connected to the main casing and in contact with the light valve element; and
a supporting component, comprising an extending portion and a supporting portion, wherein an end of the extending portion is connected to the main casing, the supporting portion is formed on another end of the extending portion, the supporting portion of the supporting component is configured to support a part of the heat dissipation structure, and the part of the heat dissipation structure is suspended above the extending portion of the supporting component.

2. The light valve module according to claim 1, wherein the heat dissipation structure comprises a heat dissipation plate, at least one heat pipe and a heat dissipation fin set, the heat dissipation plate is connected to the main casing and in contact with the light valve element, the at least one heat pipe is connected between the heat dissipation plate and the heat dissipation fin set, and the heat dissipation fin set is supported by the supporting portion.

3. The light valve module according to claim 1, further comprising a plurality of fastening elements, wherein the heat dissipation structure is fastened to the main casing by the fastening elements along a first direction, the heat dissipation structure extends from the light valve element to the supporting portion along a second direction perpendicular to the first direction, and the supporting portion is adapted to support the heat dissipation structure along a third direction perpendicular to the first direction and the second direction.

4. The light valve module according to claim 1, further comprising a protruding piece, wherein the protruding piece is connected to the part of the heat dissipation structure and protrudes toward the supporting portion.

5. The light valve module according to claim 4, further comprising a position-limiting element, wherein the protruding piece is limited on the supporting portion by the position-limiting element.

6. The light valve module according to claim 5, wherein the protruding piece has a slot, the position-limiting element comprises a fastening portion and a position-limiting portion, the fastening portion is disposed through the slot and fastened to the supporting portion, and the position-limiting portion is configured to stop the protruding piece from moving away from the supporting portion.

7. The light valve module according to claim 6, further comprising a plurality of fastening elements, wherein the heat dissipation structure is fastened to the main casing by the fastening elements along a first direction, and the slot extends along the first direction.

8. The light valve module according to claim 6, wherein a gap is formed between the protruding piece and the position-limiting portion.

9. The light valve module according to claim 5, wherein the position-limiting element is adhered to the protruding piece.

10. The light valve module according to claim 1, wherein a width of the extending portion is larger than a width of the part of the heat dissipation structure.

11. A projector, comprising:
a light source, adapted to provide an illumination beam;
a light valve module, comprising:
a main casing;
a light valve element, connected to the main casing and adapted to convert the illumination beam into an image beam;
a heat dissipation structure, connected to the main casing and in contact with the light valve element; and
a supporting component, comprising an extending portion and a supporting portion, wherein an end of the extending portion is connected to the main casing, the supporting portion is formed on another end of the extending portion, the supporting portion of the supporting component is configured to support a part of the heat dissipation structure, and the part of the heat dissipation structure is suspended above the extending portion of the supporting component; and
a projection lens, adapted to project the image beam.

12. The projector according to claim 11, wherein the heat dissipation structure comprises a heat dissipation plate, at least one heat pipe and a heat dissipation fin set, the heat dissipation plate is connected to the main casing and in contact with the light valve element, the at least one heat pipe is connected between the heat dissipation plate and the heat dissipation fin set, and the heat dissipation fin set is supported by the supporting portion.

13. The projector according to claim 11, wherein the light valve module further comprises a plurality of fastening elements, the heat dissipation structure is fastened to the main casing by the fastening elements along a first direction, the heat dissipation structure extends from the light valve element to the supporting portion along a second direction perpendicular to the first direction, and the supporting portion is adapted to support the heat dissipation structure along a third direction perpendicular to the first direction and the second direction.

14. The projector according to claim 11, wherein the light valve module further comprises a protruding piece, the protruding piece is connected to the part of the heat dissipation structure and protrudes toward the supporting portion.

15. The projector according to claim 11, wherein the light valve module further comprises a position-limiting element, wherein the protruding piece is limited on the supporting portion by the position-limiting element.

16. The projector according to claim 15, wherein the protruding piece has a slot, the position-limiting element comprises a fastening portion and a position-limiting portion, the fastening portion is disposed through the slot and fastened to the supporting portion, and the position-limiting portion is configured to stop the protruding piece from moving away from the supporting portion.

17. The projector according to claim 16, wherein the light valve module further comprises a plurality of fastening elements, wherein the heat dissipation structure is fastened to the main casing by the fastening elements along a first direction, and the slot extends along the first direction.

18. The projector according to claim 16, wherein a gap is formed between the protruding piece and the position-limiting portion.

19. The projector according to claim 15, wherein the position-limiting element is adhered to the protruding piece.

20. The projector according to claim 11, wherein a width of the extending portion is larger than a width of the part of the heat dissipation structure.

* * * * *